Figure 1:
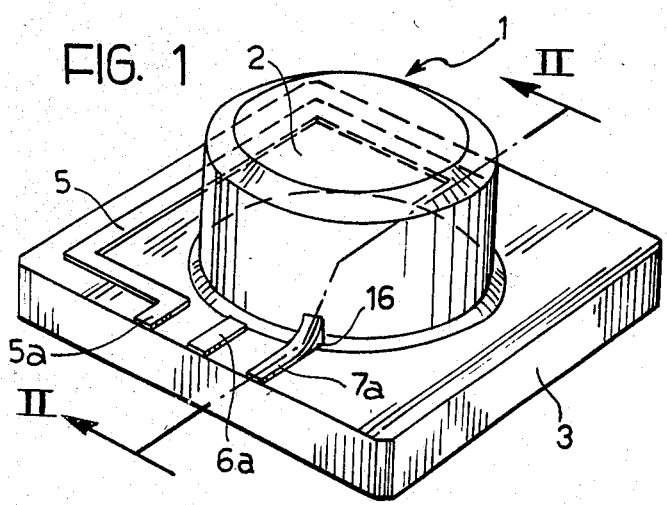

United States Patent [19]

Dell'Acqua

[11] Patent Number: 4,583,296
[45] Date of Patent: Apr. 22, 1986

[54] ELECTRICAL INCLINATION SENSOR AND METHOD FOR ITS MANUFACTURE

[75] Inventor: Roberto Dell'Acqua, Pavia, Italy

[73] Assignee: Marelli Autronica S.p.A., Italy

[21] Appl. No.: 732,786

[22] Filed: May 7, 1985

[30] Foreign Application Priority Data

May 7, 1984 [IT] Italy ............................... 67460 A/84

[51] Int. Cl.⁴ ............................................. G01C 9/06
[52] U.S. Cl. ........................................ 33/366; 33/379; 33/390
[58] Field of Search ..................... 33/366, 363 N, 379, 33/521, 365, 390

[56] References Cited

U.S. PATENT DOCUMENTS

| | | | |
|---|---|---|---|
| 3,096,591 | 7/1963 | Higgins, Jr. et al. | 33/366 |
| 3,487,303 | 12/1969 | Remington | 33/366 |
| 4,167,818 | 9/1979 | Cantarella et al. | 33/366 |

FOREIGN PATENT DOCUMENTS 488981 2/1976 U.S.S.R. ............................... 33/366

Primary Examiner—Willis Little
Attorney, Agent, or Firm—Sughrue, Mion, Zinn, Macpeak and Seas

[57] ABSTRACT

The sensor comprises a body formed by first and second elements of which at least one has a cavity, the elements being sealed together to form a chamber. The chamber contains an electrically-conductive liquid which fills it almost completely so as to form a bubble. At least one main electrode and at least one pair of auxiliary electrodes extend into the chamber through the body and are accessible on the exterior thereof, so that any variation in the inclination of the body relative to at least one predetermined direction causes a movement of the bubble and a corresponding variation in the electrical resistance measurable between each auxiliary electrode and the main electrode. The electrodes are constituted by strips of electrically-conductive material deposited by screen printing on at least one of the said elements by thick film deposition method.

16 Claims, 9 Drawing Figures

ELECTRICAL INCLINATION SENSOR AND METHOD FOR ITS MANUFACTURE

The present invention relates to an electrical inclination sensing device. In particular the invention relates to a sensor comprising a body within which is a closed chamber containing a predetermined quantity of electrically-conductive liquid which almost fills it so as to form a bubble, and at least one main electrode and at least one first and one second auxiliary electrode extending into the chamber through the body and accessible from the exterior of the body, so that any variation in the inclination of the body relative to at least one predetrmined direction causes a movement of the bubble and a corresponding variation in the electrical resistance measurable between each auxiliary electrode and the main electrode.

Electrical inclination sensors of the aforesaid type which have been made up till now each comprise a hollow, substantially-kidney-shaped glass body with two electrodes (auxiliary electrodes) extending through the ends thereof and cooperating with a main, central electrode. The conductive liquid in the body is usually an electrolyte. The electrodes of the sensor are connected to two branches of a bridge measuring circuit of known type. Hence, if the sensor is inclined along its longitudinal axis, the electrolytic liquid flows from one side of the body to the other and the resistance between the central electrode and one lateral electrode falls while the resistance between the central electrode and the other lateral electrode increases. Thus two variable resistances are formed which, when connected in an a.c. bridge, enable an electrical signal proportional to the angle of inclination of the sensor to a predetermined direction to be obtained.

The known sensor described above has various disadvantages. In the first place its characteristics depend very much on the shape of the body. The latter, as stated, is of glass and is shaped when the glass is at a high temperature and in the plastic state. The body shapes of two sensors which are nominally identical may thus be noticeably different. This is reflected to an appreciable extent in the electrical characteristics of the sensor. In order to provide a remedy for the variability in shape of the sensor, it is necessary to make use of complex electronic compensating circuits.

A further disadvantage of the known sensor lies in the fact that it is very expensive in that it requires the use of relatively expensive materials and is not readily adaptable to low-cost, production-line manufacture.

The object of the present invention is to provide an improved version of an electrical inclination-sensing device of the type specified at the beginning, which avoids the disadvantages of the known sensors.

According to the invention this object is achieved by means of a device of the said type, the main characteristic of which lies in the fact that the body comprises first and second elements, of which at least one is hollow, which are sealed together to form the said chamber, and in that the main and auxiliary electrodes are constituted by strips of electrically-conductive material deposited by screen printing on at least one of the elements.

In particular, according to the invention these electrodes are constituted by thick film conductors.

Further characteristics and advantages of the electrical sensor according to the invention will become apparent from the description which follows.

The invention also relates to a method for the manufacture of an inclination sensor of the said type.

This method is characterised in that it includes the following steps:
providing first and second elements which are electrically insulating at least on the surface, of which at least one has a cavity for forming the said chamber together with the other element;
screen printing on at least one of the elements at least first and second strips of electrically-conductive material to act as auxiliary electrodes and at least one further electrically-conductive strip to act as a main electrode, and
sealing the first and second elements together so that the electrically conductive strips are at least partly within the chamber.

Figure 2:
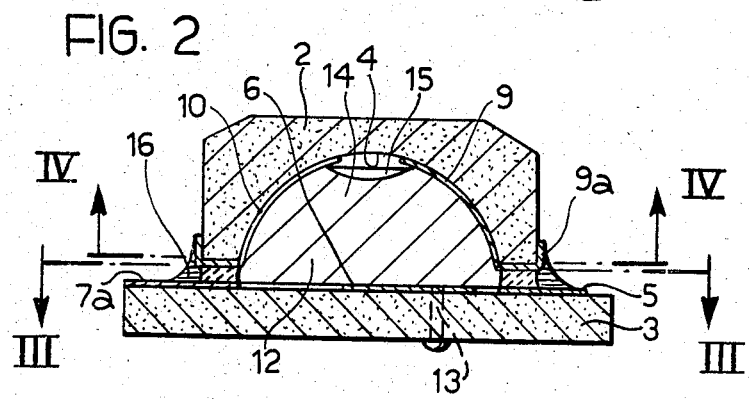
Figure 3:
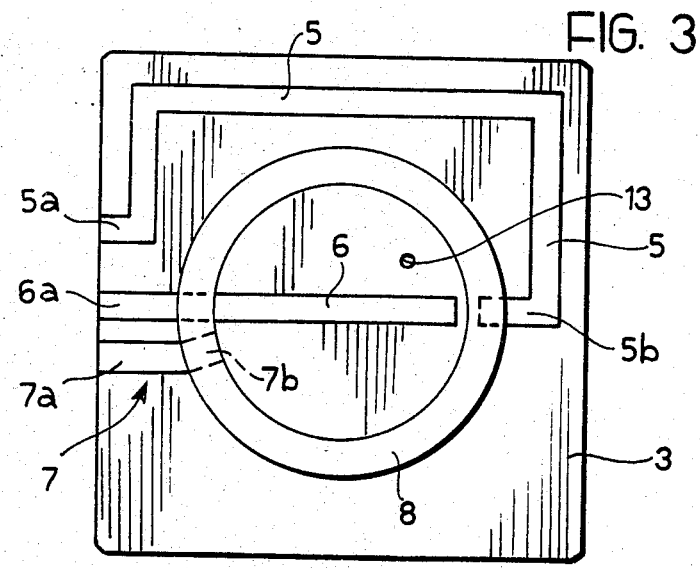
Figure 4:
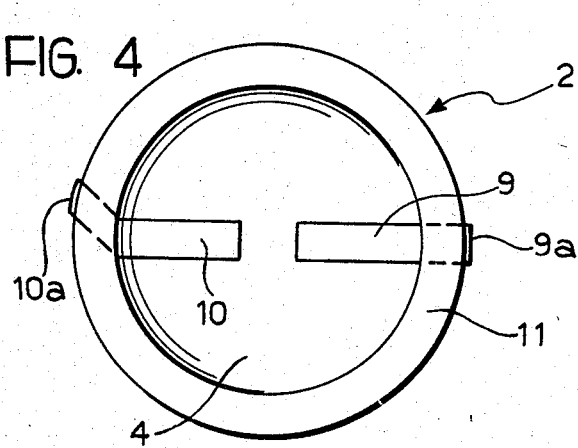
Figure 5:
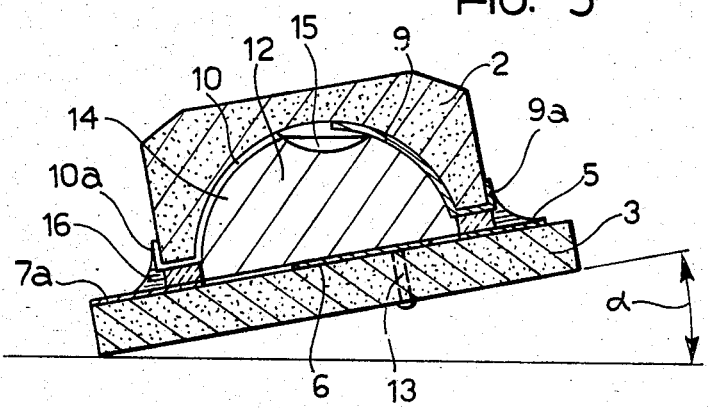
Figure 6:
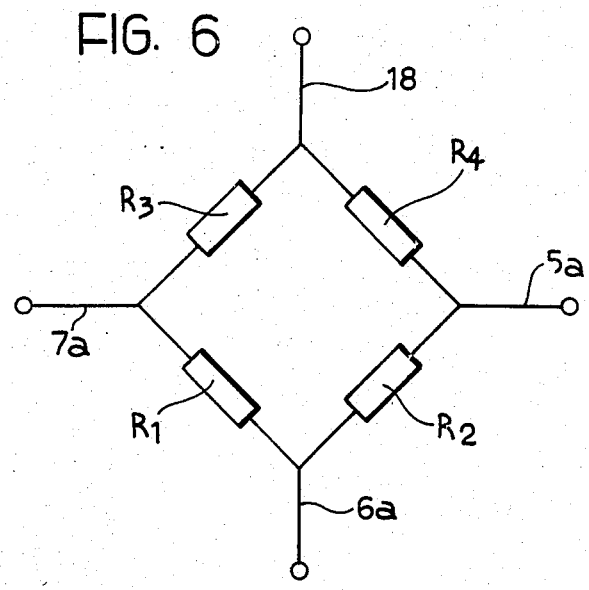
Figure 7:
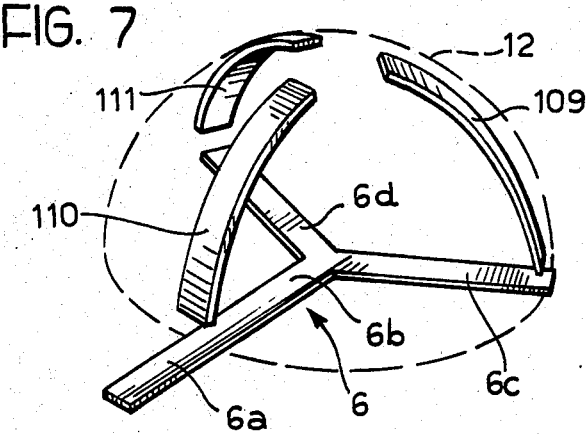
Figure 8:
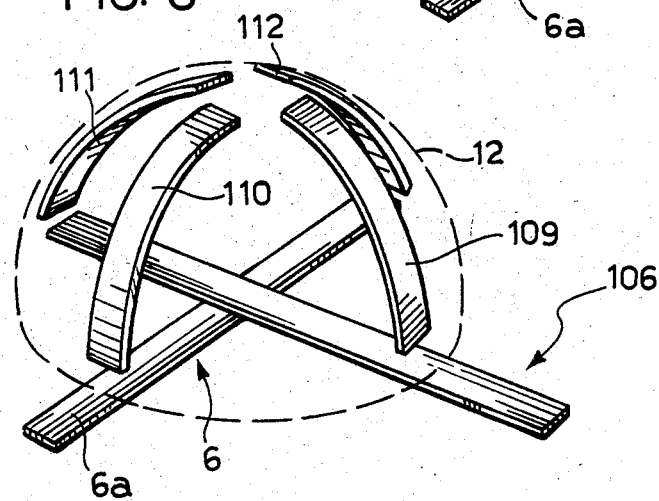
Figure 9:
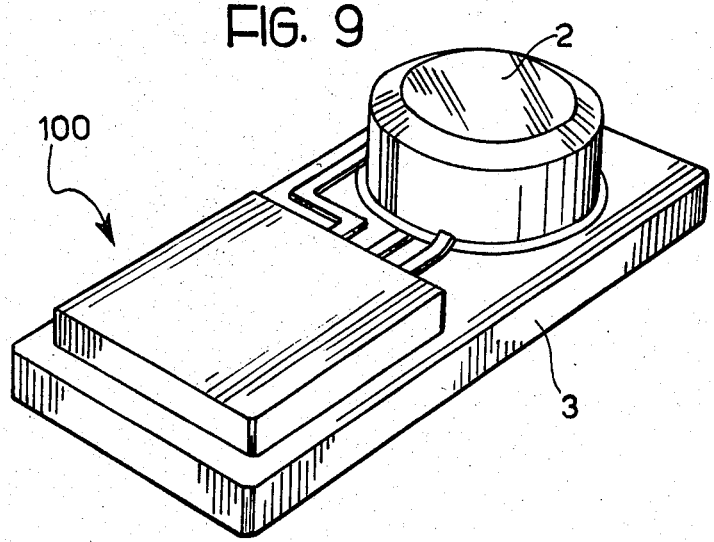

Further characteristics and advantages of the invention will become apparent from the detailed description which follows, given with reference to the appended drawings, provided purely by way of non-limiting example, in which:

FIG. 1 is a perspective view of an inclination sensor according to the invention, FIG. 2 is a section taken on the line II—II of FIG. 1, FIG. 3 is a section taken on the line III—III of FIG. 2, FIG. 4 is a section taken on the line IV—IV of FIG. 2, FIG. 5 is a section similar to FIG. 2 but with the sensor inclined to the horizontal, FIG. 6 is an electrical circuit diagram of a bridge circuit which can be used, in which the sensor according to the invention is connected to measure inclination, FIG. 7 is a schematic perspective view of an alternative arrangement of the electrodes of the sensor according to the invention for enabling the detection of the inclination of the sensor relative to a plane or relative to two axes, FIG. 8 shows an alternative arrangement of the electrodes of the sensor according to the invention for measuring inclination relative to a plane or relative to two axes, and FIG. 9 shows a variant of the sensor according to the invention in which the amplification and/or compensation circuits for the electrical signal output by the sensor in use are incorporated in a single support.

With reference to FIGS. 1 to 5, a sensor according to the invention includes a body 1 comprising two elements 2, 3 joined together. In the embodiment illustrated, the element 2 is generally cylindrical and has a cavity 4 in the shape of a hemisphere or a segment of a sphere.

The element 3 acts as a base and, in the embodiment illustrated, is substantially parallelepipedal shaped and of modest thickness.

The elements 2 and 3 may be made from ceramic, alumina ($Al_2O_3$), zirconium oxide ($Zr_2O_3$), beryllium oxide (BeO), Forsterite ($2MgO-SiO_2$), steatite ($MgO-SiO_2$), or of metals whether enamelled, vitrified or even anodised to obtain an insulating surface layer, or of yet other insulating materials.

As is apparent in particular from FIG. 3, three electrically conductive strips 5, 6 and 7 are applied to the face of the base plate 3 facing the hollow element 2. These conductive strips are applied to the support plate 3 by screen printing followed by firing according to the well known thick film method. The material constituting the strips may be any one of the materials used in the thick film method, for example a conductor based on the noble metals (silver, palladium, platinum, gold etc.) or other metals (copper, nickel, aluminium etc.) or a polymeric type conductor.

In the embodiment shown in FIG. 3, the strips 5 and 7 have respective first ends 5a, 6a and 7a adjacent each other on one and the same side of the support plate 3 to facilitate their connection to external circuits. These strips, as will become apparent below, act essentially as electrodes of the sensor.

The conductive strip 6 acts as the main or common electrode and its extent is such that, when the elements 2 and 3 are joined together, it extends into the chamber defined between them to an extent almost equal to the diameter of the circumference of the mouth of the cavity 4.

In the embodiment shown in FIGS. 1 to 5, the conductive strip, or auxiliary electrode, 5 has a second end 5b facing the end of the main electrode 6 opposite the end 6a.

A circular ring of a dielectric bonding material 8 (FIG. 3), of a shape substantially corresponding to the annular face of the body 2 surrounding the mouth of the cavity 4, is also deposited on the support plate 3 again by the thick film deposition method. The dielectric ring 8 is deposited over the end 5b of the conductive strip 5, over an intermediate portion of the main strip 6 and over the end 7b of the strip 7 opposite the end 7a (FIG. 3).

The hollow element 2 also bears conductive strips 9, 10 deposited thereon by the thick film deposition method. These conductive strips, as is apparent from FIGS. 2, 4 and 5, extend along arcs of a great circle of the spherical surface to which the surface of the cavity 4 belongs.

These strips have respective ends 9a, 10a which extend over the edge of the cavity onto the cylindrical outer surface of the hollow element 2.

The end 10a (FIG. 4) extends away from the diametral plane of the cavity 4 passing through the rest of the contact 10 and through the contact 9.

A ring 11 (FIG. 4) of dielectric bonding material is subsequently deposited on the annular surface of the hollow body 2 surrounding the mouth of the cavity 4. The dimensions of this ring correspond to those of the ring 8 applied to the support plate 3.

The hollow element 2 is joined to the support plate 3 in the following manner. The element 2 is placed on the support plate 3 so that the rings 11 and 8 face each other and the strips 10 and 9 also face the strip 6 on the support. The dielectric rings 11 and 8 are then welded together by firing. The material constituting these rings may for example be glass or an insulating resin.

As stated above, the end 10a of the conductive strip 10 deviates from the remaining part of this strip so that this end faces the conductive strip 7 on the support. The ends of the strip 10 and of the strip 7 are electrically interconnected by a weld (indicated 14 in FIG. 1) formed by a eutectic alloy or by an epoxy resin filled with particles of electrically-conductive material such as silver, gold or copper. The ends 9a of the strip 9 and the end 5b of the strip 5 are similarly welded together.

A predetermined quantity of conductive liquid 14 is introduced into the chamber 12 defined between the plate and the hollow body 2 through a hole 13 formed in the support plate 3. The hole 13 is then sealed for example by sealing with a eutectic alloy or with an epoxy resin.

The quantity of conductive liquid introduced into the chamber 12 is such as not to fill the chamber completely so that a "bubble", indicated 15 in Figures 2 and 5, is formed.

The sensor illustrated in FIGS. 1 to 5 acts as follows.

If the sensor is disposed with the plate 3 horizontal, the bubble 15 is disposed symmetrically between the conductive strips 9 and 10. In this condition the electrical resistance measurable between the strips 5 and 6 and the resistance measurable between the strips 6 and 7 are substantially equal.

If the support plate 3 is inclined, for example in the manner illustrated in FIG. 5, so as to be at an angle α to the horizontal plane, the bubble 15 moves. In this position it is possible to detect a reduction in the resistance measurable between the strips 6 and 7 and an increase in the resistance between the strips 5 and 6. These variations in resistance are indicative of the angle α.

The sensor described above may thus be connected in a bridge circuit to detect the said variations in resistance and hence the inclination of the sensor.

FIG. 6 shows one possible circuit usable for this purpose. In this Figure the resistances between the strips 6 and 7 and the strips 5 and 6 respectively are indicated $R_1$ and $R_2$, these resistances varying in accordance with the inclination as a result of the movement of the bubble 15 described above. The resistances $R_3$ and $R_4$ are those of resistors connected to the sensor in the manner illustrated so as to form a bridge. If a constant voltage is applied between the terminal 18 common to these resistors and the end 6a of the strip 6, the voltage V between the ends 5a and 7a of the strips 5 and 7 is indicative of the angle of inclination.

The embodiment illustrated in FIGS. 1 to 5 obviously allows the inclination of the sensor to be detected solely with respect to one axis.

Even if the shapes of the elements 2 and 3 of the sensor are left substantially unchanged, it is possible to form a sensor which can detect inclination relative to a plane or relative to a pair of non-parallel coplanar axes by a simple modification of the conductive strips deposited on the elements 2 and 3. FIG. 7 shows schematically one possible shape and arrangement of the conductive strips for this purpose. As is apparent from FIG. 7, it suffices to provide a main electrode or strip 6 shaped so that the part thereof enclosed within the chamber 12 effectively forms three arms 6b, 6c, 6d at 120°. Three conductive strips 109, 110, 111, also at 120° to each other, are correspondingly deposited on the cavity 4 of the hollow element 2. If the resistances between these strips and the three arms of the main strip 6 are measured it is possible to obtain an indication of the inclination of the plane of the support plate 3 to a reference plane.

An alternative arrangement of the conductive strips is shown in FIG. 8 in which two main strips 6 and 106 (superimposed and insulated from each other) form four arms at 90° within the chamber 12. Four conductive strips 109 to 112 equiangularly spaced from each other are correspondingly deposited on the wall of the cavity 4 of the hollow body 2.

Clearly it is necessary to provide a suitable number of conductive strips on the support plate 3 for variants of FIGS. 7 and 8.

As shown in FIG. 9, a hybrid circuit 100 may to advantage be formed on the support plate 3, still by the thick film method, this circuit including both supply circuits for the sensor and amplification and processing circuits for the signal output by the sensor and, optionally, calibration and thermal compensation circuits. This solution enables the formation both of the inclination sensor proper and the electronic circuit associated therewith in a single monolithic structure.

The sensor according to the invention has numerous advantages.

It is easy to manufacture on a production line with good consistency of the geometric and electrical characteristics. It may be made from extremely cheap materials and with the use of highly automated, and hence low cost, technology. The structure of the sensor is extremely strong and hence suited for use even in the presence of strong vibrations.

What we claim is:

1. Electrical inclination sensing device comprising a body in which there is formed a closed chamber containing a predetermined quantity of electrically conductive liquid which almost fills it so as to form a bubble, at least one main electrode and at least one first and one second auxiliary electrode extending into the chamber through the body and accessible from the exterior of the body, so that any variation in inclination of the body relative to at least one predetermined direction causes a movement of the bubble and a corresponding variation in the electrical resistance measurable between each auxiliary electrode and the main electrode, wherein the body comprises first and second elements of which at least one has a cavity, the elements being sealed together to form the said chamber, and wherein the main and auxiliary electrodes are constituted by strips of electrically conductive material deposited by screen printing on at least one of the elements.

2. A device according to claim 1, wherein the strips are formed by the thick film deposition method.

3. A device according to claim 2, wherein the first and second elements are joined together by a dielectric bonding material.

4. A device according to claim 3, wherein the dielectric bonding material is deposited on at least one of the elements by the thick film deposition method.

5. A device according to claim 1, wherein one of the said elements forming the said chamber is planar while the other has a cavity, and at least a main electrode is applied to the planar element while the auxiliary electrodes are applied at least partly to the hollow element.

6. A device according to claim 1, including at least three auxiliary electrodes cooperating with at least one main electrode to allow the detection of the inclination of the body relative to a plane.

7. A device according to claim 1, including first and second main electrodes cooperating respectively with first and second pairs of auxiliary electrodes.

8. A device according to claim 1, wherein the said elements forming the body are mde of ceramic material.

9. A device according to claim 1, wherein the elements forming the body are made of metal with a surface layer of electrically insulating material.

10. A device according to claim 1, wherein hybrid amplification and/or measuring and/or thermal compensation circuits are deposited on one of the elements outside the chamber by the thick film deposition method.

11. A method for the manufacture of an inclination sensor including the following steps:
providing first and second elements which are electrically insulating at least on the surface, of which at least one has a cavity for forming a chamber together with the other element;
applying at least first and second strips of electrically-conductive material to at least one of the said elements to act as electrodes and auxiliary electrodes and at least one further electrically-conductive strip for acting as a main electrode, introducing a conductive liquid into said chamber until it almost fills so as to form a bubble, and
sealing the first and second elements together so that the electrically-conductive strips are at least partly within the chamber.

12. A method according to claim 11, wherein the conductive liquid is introduced into the chamber through a hole formed in one of the elements forming the body and in that the hole is sealed hermetically after the introduction of the conductive liquid.

13. A method according to claim 11, wherein the liquid is poured into the cavity of one of the elements; the elements then being sealed together.

14. A method according to claim 11, wherein the conductive strips and the layers of dielectric bonding material are applied in succession to the elements by the thick film deposition method.

15. A method according to claim 11, wherein one of the said elements forming the chamber is planar while the other has a cavity and in that the at least one main electrode is applied to the plain element while the auxiliary electrodes are applied to the hollow element.

16. A method according to claim 11, wherein a hybrid supply and/or amplification and/or measuring and/or thermal compensation circuit is formed on at least one of the elements constituting the body by the thick film method; the said circuit being connected to the main and auxiliary electrodes by conductive strips formed by the thick film deposition method on one or both of the said elements.

* * * * *